United States Patent
Setoh et al.

(10) Patent No.: US 7,991,058 B2
(45) Date of Patent: Aug. 2, 2011

(54) OFDM RECEPTION DEVICE

(75) Inventors: Koji Setoh, Osaka (JP); Ippei Kanno, Kyoto (JP); Akira Kisoda, Osaka (JP); Daisuke Hayashi, Osaka (JP); Ryosuke Mori, Osaka (JP); Tetsuya Yagi, Osaka (JP); Noritaka Iguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 773 days.

(21) Appl. No.: 11/793,527

(22) PCT Filed: Dec. 21, 2005

(86) PCT No.: PCT/JP2005/023507
§ 371 (c)(1),
(2), (4) Date: Apr. 1, 2008

(87) PCT Pub. No.: WO2006/068186
PCT Pub. Date: Jun. 29, 2006

(65) Prior Publication Data
US 2008/0304587 A1      Dec. 11, 2008

(30) Foreign Application Priority Data
Dec. 21, 2004   (JP) .................................. 2004-368780

(51) Int. Cl.
*H04L 27/28* (2006.01)
(52) U.S. Cl. ........ 375/260; 375/259; 375/346; 375/340; 375/316; 375/362; 370/208; 370/203; 455/59; 455/60
(58) Field of Classification Search .................. 375/260, 375/259, 346, 340, 316, 362; 370/208, 203; 455/59, 60
See application file for complete search history.

(56) References Cited

U.S. PATENT DOCUMENTS

| | | | |
|---|---|---|---|
| 6,580,761 B2 | 6/2003 | Laroia et al. | |
| 6,628,722 B1 | 9/2003 | Laroia et al. | |
| 6,687,315 B2 * | 2/2004 | Keevill et al. | 375/341 |
| 7,139,320 B1 * | 11/2006 | Singh et al. | 375/260 |
| 2001/0036233 A1 | 11/2001 | Laroia et al. | |
| 2002/0073436 A1 | 6/2002 | Cowley et al. | |
| 2002/0126220 A1 * | 9/2002 | Wilson et al. | 348/518 |
| 2003/0016773 A1 * | 1/2003 | Atungsiri et al. | 375/355 |
| 2004/0091057 A1 * | 5/2004 | Yoshida | 375/260 |
| 2005/0220001 A1 * | 10/2005 | Henriksson | 370/208 |
| 2005/0276337 A1 | 12/2005 | Khan | |

FOREIGN PATENT DOCUMENTS

| | | |
|---|---|---|
| EP | 0 836 304 | 4/1998 |
| EP | 0 837 582 | 4/1998 |
| EP | 0 966 135 | 12/1999 |
| EP | 1 043 874 | 10/2000 |
| JP | 10-126288 | 5/1998 |

(Continued)

*Primary Examiner* — Kenneth Lam
(74) *Attorney, Agent, or Firm* — Wenderoth, Lind & Ponack, L.L.P.

(57) ABSTRACT

An OFDM reception device detects a time at which impulse noise occurs in a received OFDM signal, and specifies a start position candidate period that does not have intersymbol interference and is estimated to have a guard interval signal in a symbol. When setting a FFT window of an effective symbol length in a symbol duration of each symbol, if the impulse noise occurrence time is included in the symbol, the OFDM reception device determines a start position of the FFT window within a range of the start position candidate period so as to exclude the impulse noise occurrence time as much as possible.

10 Claims, 12 Drawing Sheets

FOREIGN PATENT DOCUMENTS

| | | |
|---|---|---|
| JP | 10-126353 | 5/1998 |
| JP | 2000-68976 | 3/2000 |
| JP | 2002-152613 | 5/2002 |
| JP | 2002-171238 | 6/2002 |
| JP | 2003-143104 | 5/2003 |
| JP | 2003-283413 | 10/2003 |
| JP | 2005-354705 | 12/2005 |
| WO | 2004/004143 | 1/2004 |

* cited by examiner

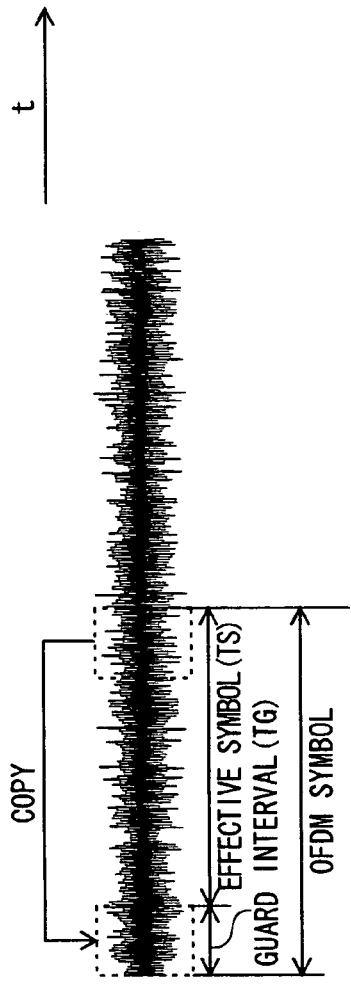
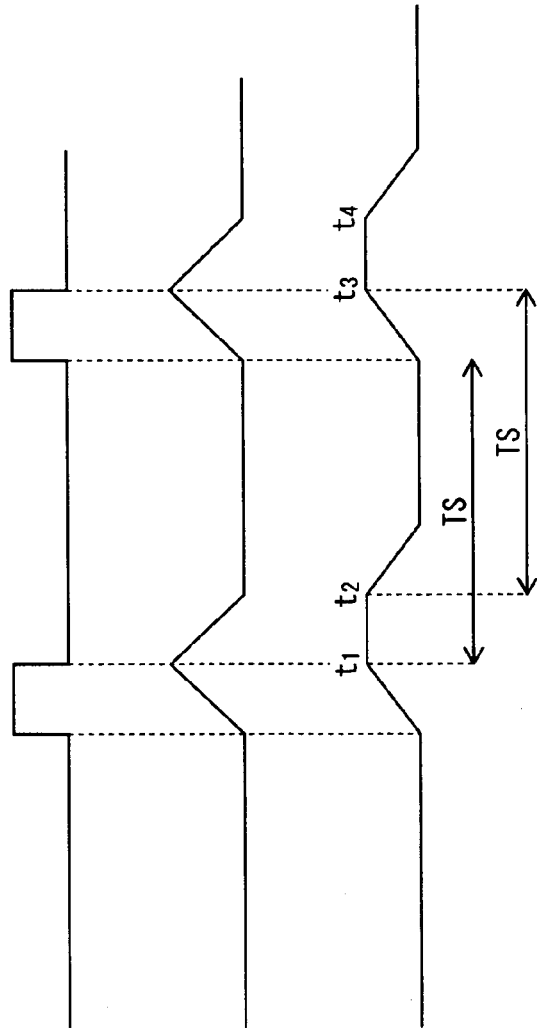
FIG. 4A  OFDM SIGNAL
FIG. 4B  DELAYED SIGNAL
FIG. 4C  CORRELATION SIGNAL
FIG. 4D  MOVING AVERAGE (INTEGRATION) SIGNAL (TG)
FIG. 4E  MOVING AVERAGE (INTEGRATION) SIGNAL (2TG)

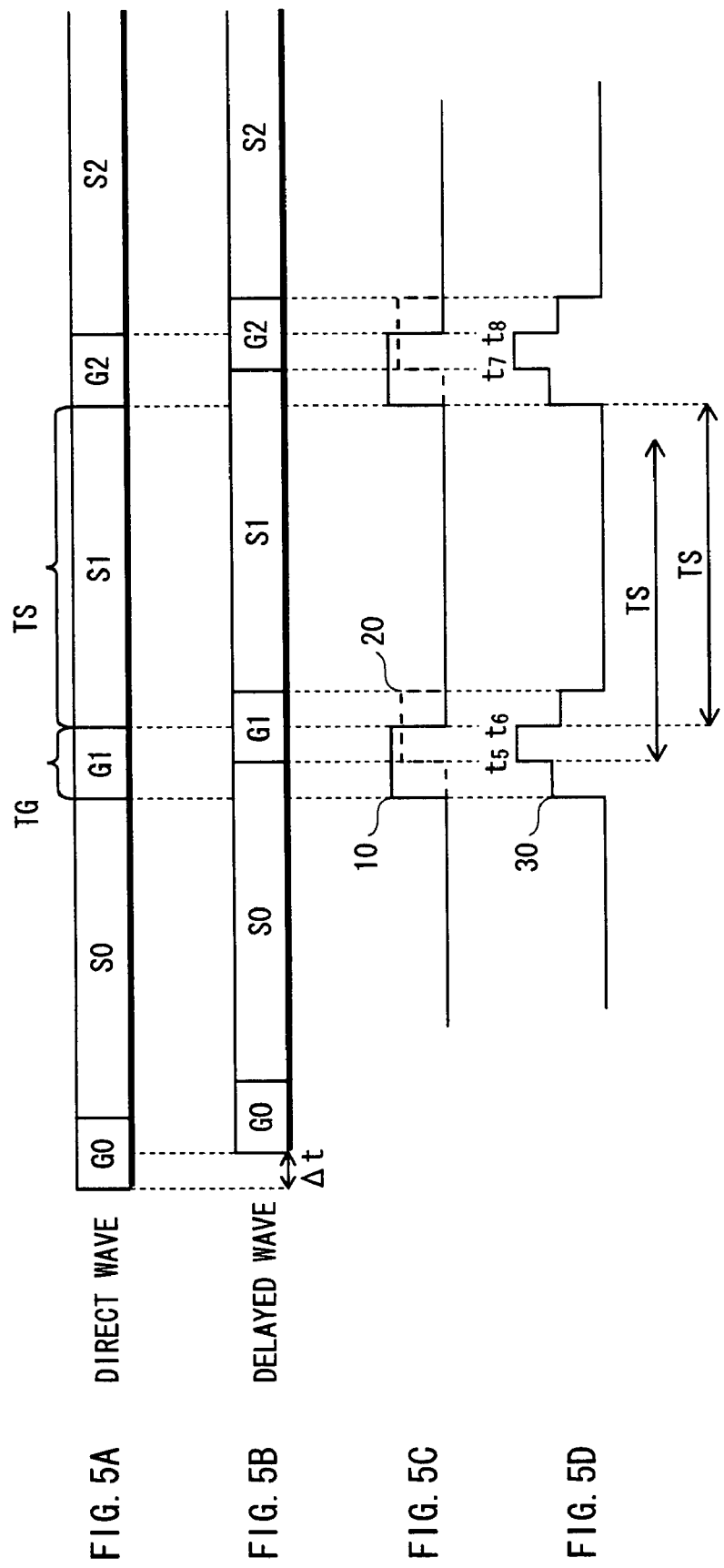

OFDM RECEPTION DEVICE

TECHNICAL FIELD

The present invention relates to an OFDM (Orthogonal Frequency Division Multiplexing) reception device, and especially relates to techniques of controlling positioning of a time section (hereafter referred to as a "FFT window") to perform a Fast Fourier Transform (FFT) for each symbol of a received OFDM signal.

BACKGROUND ART

In recent years, Japan started digital terrestrial broadcasting by ISDB-T (Integrated Services Digital Broadcasting-Terrestrial transmission), and Europe started digital terrestrial broadcasting by DVB-T (Digital Video Broadcasting-Terrestrial transmission). Furthermore, DVB-H (Digital Video Broadcasting-Handhelds transmission) for mobile devices is about to be launched.

These transmission methods employ OFDM which is one of the digital modulation schemes. OFDM has an excellent frequency use efficiency and is suitable for high-speed data communications.

Each symbol of an OFDM signal in ISDB-T is composed of an effective symbol duration signal and a guard interval signal. At the transmitting end, the effective symbol duration signal and the guard interval signal inserted before the effective symbol duration signal are transmitted. The effective symbol duration signal is a signal on a time axis generated as a result of modulation by performing an Inverse FFT (IFFT) on amplitude and phase information of each subcarrier on a frequency axis. The guard interval signal is a copy of a latter portion of the effective symbol duration signal.

At the receiving end, A/D conversion and quadrature detection are performed on the received OFDM signal, synchronization of each symbol is detected based on the quadrature detected signal, and a FFT is performed on a signal of an effective symbol length for each symbol, with it being possible to demodulate into amplitude and phase information on the frequency axis.

Patent document 1 discloses a technique of obtaining a proper FFT result based on a symbol structure of an OFDM signal by setting, even when intersymbol interference by multipath occurs in each received symbol, a start position of a FFT window so as to exclude a period during which the intersymbol interference occurs if that period is within the range of the guard interval.

However, other than multipath interference, impulse noise of an extremely large amplitude may be received depending on an OFDM signal reception environment.

If a FFT is performed on a symbol containing such noise for demodulation in the above manner, the impulse noise significantly influences the entire symbol, and original data cannot be recovered even by error correction after the demodulation.

Patent document 2 describes a technique of, when impulse noise of a large amplitude is received, setting an amplitude of a portion where the impulse noise is detected to 0 before performing a FFT, thereby reducing an adverse effect of the impulse noise.

Patent document 1: Japanese patent application publication No. 2002-171238.
Patent document 2: Japanese patent application publication No. 2002-152613.

DISCLOSURE OF THE INVENTION

Problems the Invention is Going to Solve

According to the technique described in patent document 2, even when impulse noise is included in a FFT window, an amplitude of an impulse noise portion is changed to 0 before a FFT, so that an influence of the noise on a signal generated as a result of the FFT can be reduced. However, since an amplitude of each impulse noise portion is uniformly changed to 0, a degradation in reception quality from the original OFDM signal is inevitable.

The present invention was conceived in view of the above problem, and aims to provide an OFDM reception device for controlling to perform a FFT so as to reduce a degradation in reception quality of an OFDM signal when impulse noise of a large amplitude is received.

Means of Solving the Problems

The stated aim can be achieved by an OFDM reception device that receives an OFDM signal in which a guard interval signal is inserted in each symbol, and demodulates the received OFDM signal by performing a FFT on a signal of an effective symbol length for each symbol, the OFDM reception device including: a detection unit operable to detect an impulse noise occurrence time at which impulse noise whose amplitude is no less than a predetermined value occurs in the received OFDM signal; and a FFT control unit operable to, if the impulse noise occurrence time is within a duration estimated to have the guard interval signal in a symbol or within a duration estimated to have a signal equivalent to the guard interval signal in the symbol, control the FFT to be performed using a signal, in the symbol, that substitutes for a signal at the impulse noise occurrence time without using the signal at the impulse noise occurrence time.

Here, the FFT may be performed by a FFT circuit, wherein the FFT control unit includes: a FFT window determination unit operable to determine, for each symbol, a signal of the effective symbol length as a FFT window that is subjected to the FFT, and supply a signal that constitutes the FFT window to the FFT circuit.

In this specification, a guard interval signal means a signal that is identical to a signal of a latter portion of an effective symbol duration in transmission, and a guard interval means a period during which the guard interval signal is transmitted. Also, a guard length means a length of the guard interval in transmission, and an effective symbol length means a length of the effective symbol duration in transmission.

Effects of the Invention

According to this construction, when an OFDM signal containing impulse noise is received, the OFDM reception device sets a FFT window without including a signal at a time when the impulse noise occurs, if the impulse noise occurs within the guard interval of the symbol specified in the OFDM signal or within a portion (hereafter referred to as a "guard correspondence duration") of the effective symbol duration that includes a same signal as the guard interval in transmission. Hence a proper FFT result can be obtained without changing the signal value at the impulse noise occurrence time.

Here, the OFDM reception device may further include: a correlation calculation unit operable to calculate, for each symbol, a correlation between the received OFDM signal and a delayed OFDM signal generated by delaying the received OFDM signal by the effective symbol length; and an averaging unit operable to average correlations in a plurality of symbols except the symbol containing the impulse noise, and estimate the duration having the guard interval signal based on an average correlation.

According to this construction, the amount of correlation between the original OFDM signal and the delayed signal generated by delaying the OFDM signal by the effective symbol length is greater when the two signals are similar, and smaller when the two signals are not similar. The amount of correlation between the two signals is greatest in the guard correspondence duration of each symbol. However, the amount of correlation differs between when impulse noise is contained in the guard interval or the guard correspondence duration of a symbol of the received OFDM signal and when impulse noise is not contained. Accordingly, a more correct correlation can be determined by not using, in averaging, the amount of correlation of a symbol containing impulse noise. Hence a period when intersymbol interference exists can be specified in each symbol, and a FFT window can be positioned excluding this period.

Here, the received OFDM signal may be transmitted in a state of including a plurality of predetermined reference signals, wherein the OFDM reception device holds reference signal information showing a predetermined reference signal, and the OFDM reception device further includes: an extraction unit operable to extract each reference signal after the FFT; and an interpolation unit operable to estimate channel characteristics by comparing each extracted reference signal except a reference signal in the symbol containing the impulse noise, with the reference signal shown by the reference signal information, and perform interpolation using the channel characteristics.

A reference signal is a signal inserted in advance in order to estimate a channel through which the received OFDM signal has been transmitted. Since a position at which the reference signal is inserted is known at the receiving end, channel characteristics can be estimated by a complex division of a received reference signal and a known reference signal.

According to this construction, when the impulse noise occurs in the effective symbol duration except the guard correspondence duration, there is no signal in the symbol that can substitute for the signal at the impulse noise occurrence time, so that it is difficult to set the FFT window without including the impulse noise occurrence time. In such a case, a reference signal of the symbol containing the impulse noise is included in the signal generated as a result of the FFT. This reference signal is affected by the impulse noise. However, by estimating channel characteristics using only reference signals other than this reference signal, a deviation from actual channel characteristics can be reduced.

Here, the OFDM reception device may further include: a decoding unit operable to decode the OFDM signal after the FFT; an error correction unit operable to perform error correction of the decoded signal; and an error correction control unit operable to control to start and stop the error correction unit so that the error correction unit starts the error correction when the impulse noise is detected by the detection unit.

According to this construction, when the impulse noise occurs in the effective symbol duration except the guard correspondence duration, the FFT cannot be performed without including the signal at the impulse noise occurrence time, as mentioned earlier. In this case, there is a high possibility that a bit error exists in the data decoded after the FFT. Therefore, if the occurrence of the impulse noise is detected, error correction is automatically performed on the decoded data, with it being possible to reduce the bit error. The error correction is stopped only when the error correction is not required. In this way, power consumed by the error correction can be saved.

BRIEF DESCRIPTION OF THE DRAWINGS

FIG. 4A shows a structure of an OFDM signal which is an input signal, FIG. 4B shows an output signal of a delay unit, FIG. 4C shows an output signal of a correlation calculation unit, FIG. 4D shows a waveform of a moving average (integration) signal generated as a result of moving average (integration) of a correlation signal by a guard length (TG), and FIG. 4E shows a waveform of a moving average (integration) signal generated as a result of moving average (integration) of the correlation signal by double the guard length (2TG).

FIG. 5A shows a direct wave of an OFDM signal, FIG. 5B shows a delayed wave caused by multipath, FIG. 5C shows a waveform showing a correlation of each of the waves of FIGS. 5A and 5B, and FIG. 5D shows a waveform generated by combining the waveforms of FIG. 5C.

BEST MODE FOR CARRYING OUT THE INVENTION

First Embodiment

<Overview>

An OFDM reception device according to the present invention reduces, if an OFDM signal containing impulse noise whose amplitude is no less than a threshold value is received, an influence of the impulse noise when performing a FFT on the OFDM signal in units of symbols.

Figure 12:
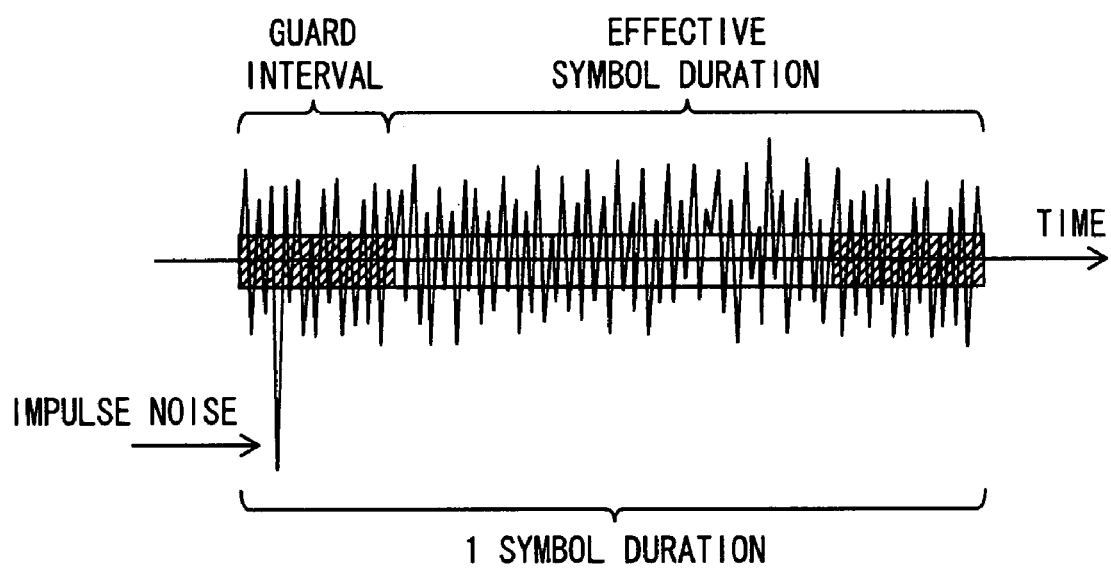
FIG. 12 shows a symbol of an OFDM signal containing impulse noise.

In the present invention, in a case where an OFDM signal containing impulse noise is received as shown in FIG. 12, a time at which the impulse noise occurs is detected. When setting a FFT window of a symbol containing the impulse noise, the FFT window of an effective symbol length is positioned so as to exclude a signal at the impulse noise occurrence time as much as possible.

The following describes an embodiment of the OFDM reception device according to the present invention.

The OFDM reception device in this embodiment receives an OFDM signal transmitted by ISDB-T. This OFDM signal is transmitted in any one of three transmission modes (MODE1 to MODE3) that differ in subcarrier interval, guard length, effective symbol length, and the like. It is assumed here that the OFDM reception device knows the transmission mode of the received OFDM signal in advance.

Also, the OFDM signal includes a reference signal called a scattered pilot (SP) signal for estimating channel characteristics in a time axis direction and a frequency axis direction, and a TMCC (Transmission and Multiplexing Configuration Control) signal showing transmission parameters such as interleave and error correction information and the like.

<Construction>

Figure 1:
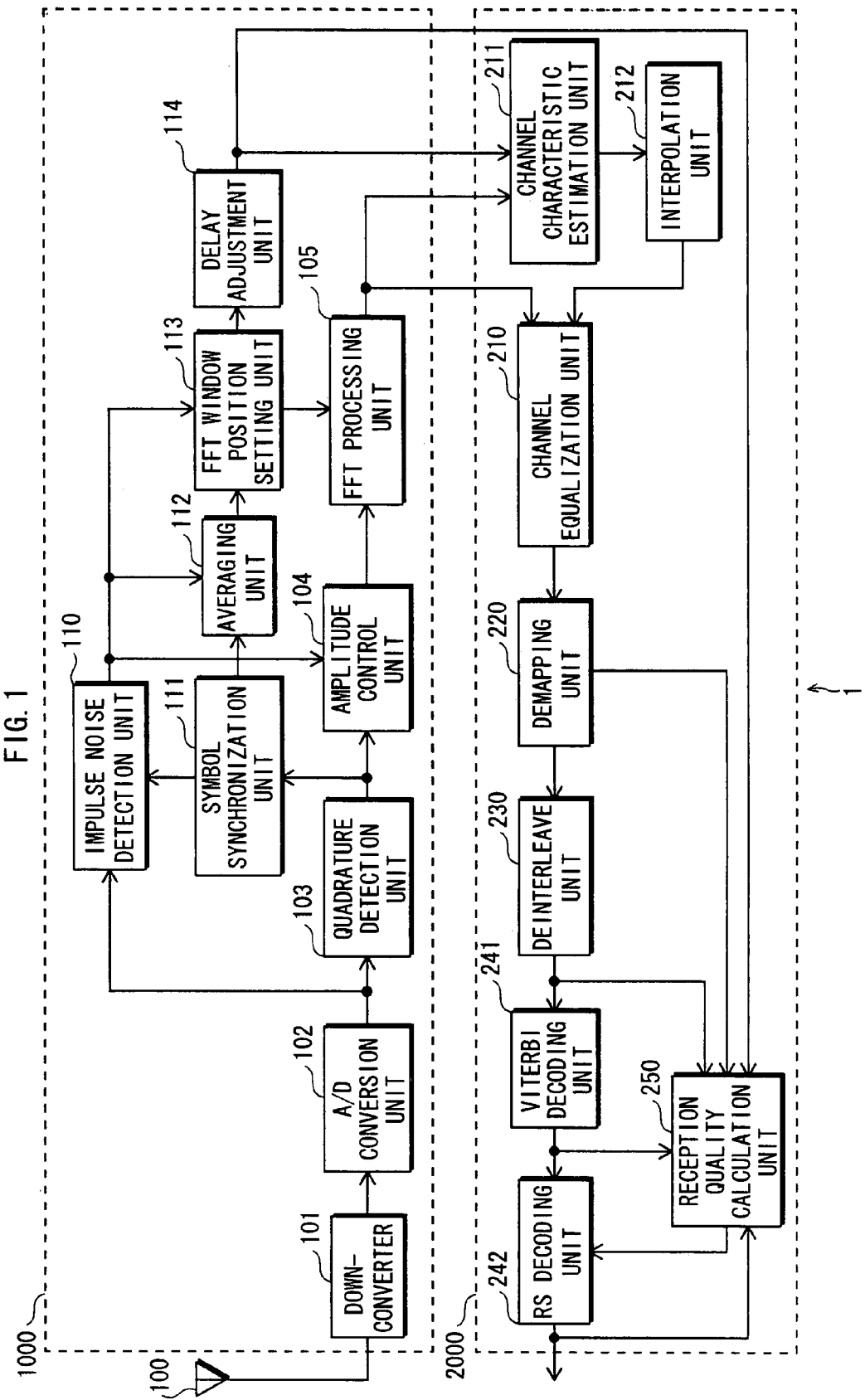
FIG. 1 is a functional block diagram of an OFDM reception device according to a first embodiment.

FIG. 1 shows a functional construction of the OFDM reception device according to the present invention. An OFDM reception device 1 is roughly made up of a time axis processing unit 1000 for performing a FFT on a received OFDM signal to convert amplitude and phase information on a time axis to amplitude and phase information on a frequency axis, and a frequency axis processing unit 2000 for demodulating and decoding the signal after the FFT.

The time axis processing unit 1000 includes a down converter 101, an A/D conversion unit 102, a quadrature detection unit 103, an amplitude control unit 104, a FFT processing unit 105, an impulse noise detection unit 110, a symbol synchronization unit 111, an averaging unit 112, a FFT window position setting unit 113, and a delay adjustment unit 114.

The following describes each of these units.

<Downconverter 101>

The downconverter 101 receives an OFDM signal via an antenna 100, selects a signal of a channel chosen by a user, and converts the selected signal to a baseband signal.

<A/D Conversion Unit 102>

The A/D conversion unit 102 converts the baseband signal generated by the downconverter 101 to a digital signal, and outputs the digital signal to the quadrature detection unit 103 and the impulse noise detection unit 110.

<Quadrature Detection Unit 103>

The quadrature detection unit 103 performs quadrature detection on the digital signal output from the A/D conversion unit 102, and converts a signal of each subcarrier to a complex signal by separating it into an in-phase axis (I axis) signal and a quadrature-phase axis (Q axis) signal.

<Impulse Noise Detection Unit 110>

The impulse noise detection unit 110 judges, when the digital signal output from the A/D conversion unit 102 has an amplitude no less than a predetermined threshold value, that the digital signal is impulse noise, and detects a time at which the impulse noise occurs. Here, a maximum value clipped in the A/D conversion may be used as the threshold value.

Also, the impulse noise detection unit 110 receives a correlation signal showing symbol synchronization from the symbol synchronization unit 111, and specifies at which position of a symbol the impulse noise occurs. Further, the impulse noise detection unit 110 outputs noise occurrence information showing the impulse noise occurrence time to the amplitude control unit 104, the averaging unit 112, and the FFT window position setting unit 113.

<Symbol Synchronization Unit 111>

The symbol synchronization unit 111 calculates a correlation of the received OFDM signal based on the complex signal generated as a result of the quadrature detection, and outputs a calculation result to the averaging unit 112.

Figure 2:
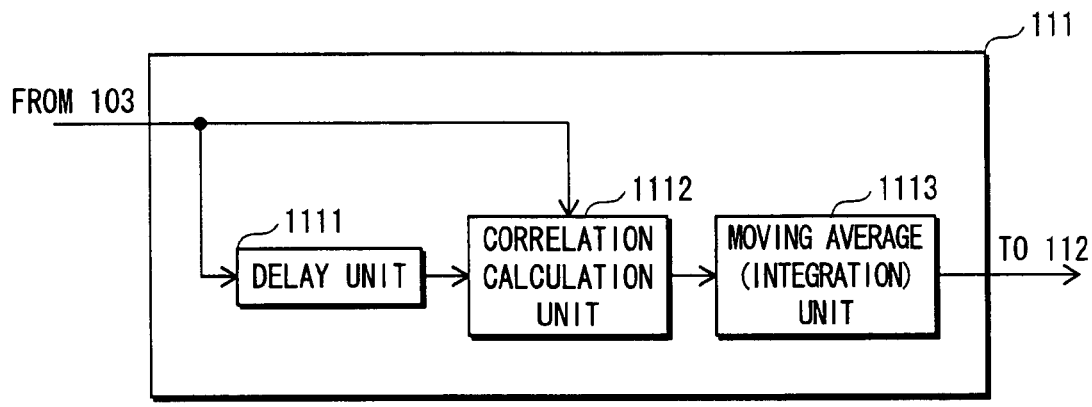
FIG. 2 is a functional block diagram of a symbol synchronization unit in the OFDM reception device according to the present invention.

FIG. 2 is a functional block diagram of the symbol synchronization unit 111. The symbol synchronization unit 111 includes a delay unit 1111, a correlation calculation unit 1112, and a moving average (integration) unit 1113.

The delay unit 1111 delays the complex signal by the effective symbol length, and outputs the delayed complex signal to the correlation calculation unit 1112.

The correlation calculation unit 1112 multiplies the complex signal output from the quadrature detection unit 103 and a complex conjugate of the delayed complex signal output from the delay unit 1111, to calculate a correlation that shows a degree of similarity between the two signals. The correlation calculation unit 1112 outputs a calculation result to the moving average (integration) unit 1113 as a correlation signal. A value of the correlation signal is greater when the two signals are similar, i.e., when the two signals correlate with each other, and smaller when the two signals are not similar, i.e., when the two signals do not correlate with each other.

The moving average (integration) unit 1113 receives an input of the correlation signal, performs moving average (integration) according to the guard length, and outputs a moving average (integration) signal to the averaging unit 112 and the impulse noise detection unit 110.

The above symbol synchronization process is explained below, with reference to FIG. 4.

FIG. 4A shows a symbol of an OFDM signal that is not affected by multipath.

As shown in FIG. 4A, the symbol of the OFDM signal is composed of an effective symbol duration signal and a guard interval signal. Accordingly, the original signal and a signal generated by delaying the original signal by the effective symbol length are identical to each other in the guard interval section, where a strong correlation exists.

This being so, when the correlation calculation unit 1112 calculates the correlation between the input signal (FIG. 4A) and the signal generated by delaying the input signal by the effective symbol length by the delay unit 1111 (FIG. 4B), a correlation signal shown in FIG. 4C is obtained.

When the moving average (integration) unit 1113 performs moving average (integration) of the guard length on this correlation signal, a waveform shown in FIG. 4D is obtained. As shown in FIG. 4D, a peak appears at a specific position in one symbol duration, with it being possible to specify a start position of the effective symbol duration.

Also, when the moving average (integration) unit 1113 performs moving average (integration) of double the guard length (2TG) on the correlation signal, a trapezoidal waveform shown in FIG. 4E is obtained. A flat portion of the trapezoid in this waveform matches the guard interval.

Similarly, an OFDM signal affected by multipath is explained below, with reference to FIG. 5.

The OFDM signal affected by multipath interference is received in a state where a direct wave and a delayed wave are superimposed with each other. FIG. 5A shows the direct wave, whereas FIG. 5B shows the delayed wave which has a delay of Δt (t<TG) from the direct wave.

Suppose the correlation is calculated and the moving average (integration) of double the guard length, (2TG) is performed for each of FIGS. 4A and 4B in the same way as above. In FIG. 5C, a waveform 10 indicated by the solid line represents a correlation calculation result of the direct wave, and a waveform 20 indicated by the dashed line represents a correlation calculation result of the delayed wave.

Since the direct wave and the delayed wave are superimposed with each other, a waveform 30 shown in FIG. 5D, which combines the correlations of FIG. 5C, represents a correlation calculation result of the OFDM signal affected by multipath interference.

In this case, a flat section from t5 to t6 and a flat section from t7 to t8 each correspond to a period that includes a signal of a guard interval where no intersymbol interference by multipath is present. By setting a start position of a FFT window anywhere in this period, it is possible to conduct demodulation under no multipath influence. This period is hereafter referred to as a "start position candidate period".

In this embodiment, the same symbol synchronization process is applied to an OFDM signal affected by impulse noise. In such a case, however, a correlation signal is smoothed using a past correlation signal in the averaging unit (described later), thereby suppressing the influence of impulse noise on symbol synchronization.

<Averaging Unit 112>

Figure 3:
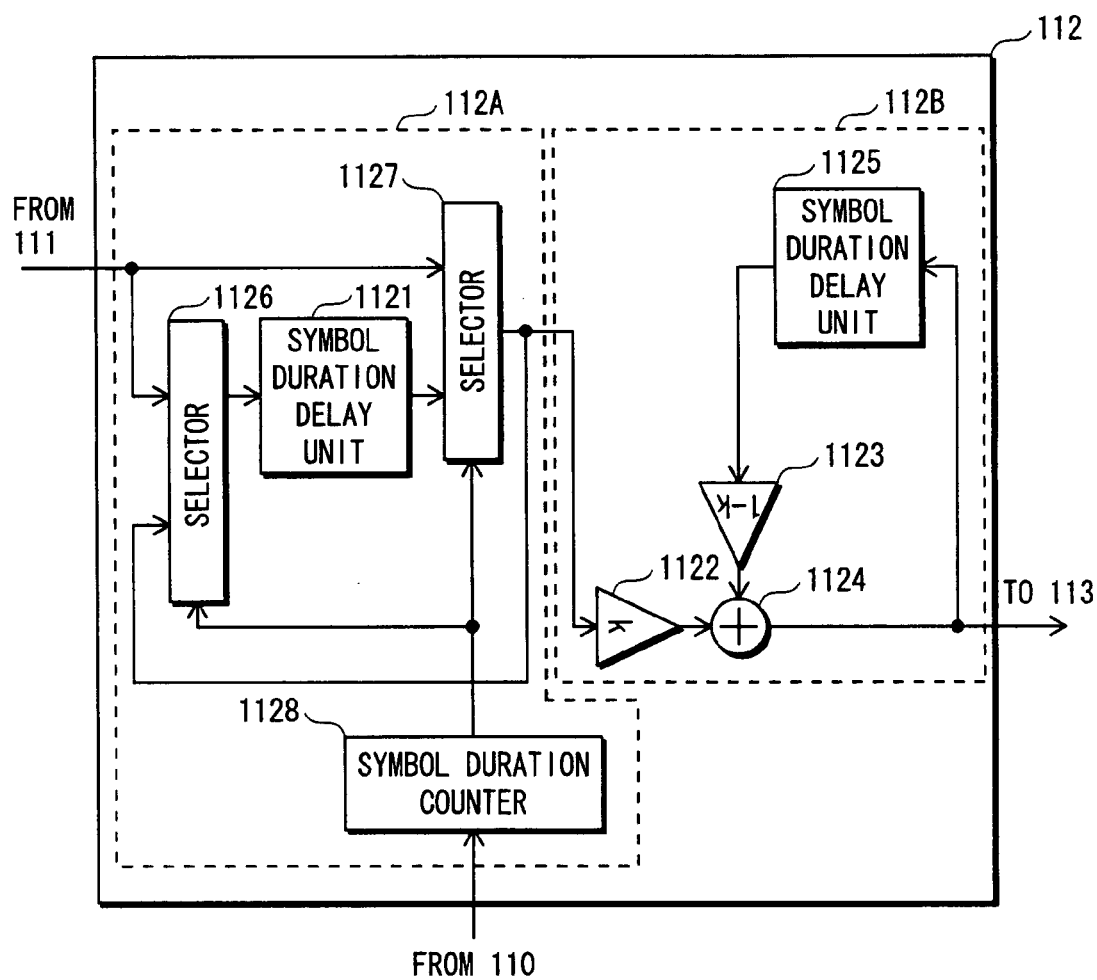
FIG. 3 is a functional block diagram of an averaging unit in the OFDM reception device according to the present invention.

The averaging unit 112 smoothes a correlation signal that is output from the symbol synchronization unit 111 in units of symbols. FIG. 3 is a functional block diagram of the averaging unit 112.

As shown in FIG. 3, the averaging unit 112 includes a signal selection unit 112A and a symbol cycle filter 112B, and feeds a correlation signal selected and output by the signal selection unit 112A into the symbol cycle filter 112B which smoothes the correlation signal.

The following describes each of these units.

The signal selection unit 112A includes a symbol duration delay unit 1121, a symbol duration counter 1128, a selector 1126, and a selector 1127.

The symbol duration counter 1128 counts, upon receiving noise occurrence information from the impulse noise detection unit 110 while the correlation signal is being supplied from the symbol synchronization unit 111 to the averaging unit 112, up to one symbol duration from the reception. The symbol duration counter 1128 outputs "1" during the count of one symbol duration, and outputs "0" when the count of one symbol duration ends and no noise detection signal is output from the impulse noise detection unit 110.

The selector 1126 selects a signal output from the selector 1127 and outputs the selected signal to the symbol duration delay unit 1121 while "1" is being output from the symbol duration counter 1128, and selects a signal output from the symbol synchronization unit 111 and outputs the selected signal to the symbol duration delay unit 1121 while "0" is being output from the symbol duration counter 1128.

The symbol duration delay unit 1121 is a shift register of a length corresponding to one symbol duration, and outputs a signal that is one symbol duration ago.

The selector 1127 selects a signal output from the symbol duration delay unit 1121 and outputs the selected signal to the symbol cycle filter 112B while "1" is being output from the symbol duration counter 1128, and selects a signal output from the symbol synchronization unit 111 and outputs the selected signal to the symbol cycle filter 112B while "0" is being output from the symbol duration counter 1128.

The symbol cycle filter 112B is described next.

The symbol cycle filter 112B is an IIR (Infinite Impulse Response) filter that receives an input of the correlation signal selected by the signal selection unit 112A, and performs weighting addition on the input signal and an output signal that is one symbol duration ago, thereby smoothing a correlation signal between a plurality of symbols.

The symbol cycle filter 112B includes a coefficient multiplier 1122, a coefficient multiplier 1123, an adder 1124, and a symbol duration delay unit 1125. The symbol cycle filter 112B has "k" and "1−k" respectively as multiplier coefficients of the coefficient multipliers 1122 and 1123.

Let Xin(z) be z conversion of a correlation signal input in the symbol cycle filter 112B, Xout(z) be z conversion of an output of the symbol cycle filter 112B, and Ns be a sample number corresponding to a symbol. This being the case, $k \cdot Xin(z) + (1-k) \cdot z^{-Ns} \cdot Xout(z) = Xout(z)$ holds true in the adder 1124.

Here, transfer function H(z) can be expressed as $H(z) = (1-(1-k)*z^{-Ns})$. If a reception device that receives an OFDM signal is not mobile, intersymbol interference hardly changes. Accordingly, intersymbol interference can be estimated more accurately through the above averaging.

Thus, even when the symbol synchronization unit 111 calculates a correlation of an OFDM signal including a signal of an impulse noise portion and inputs a correlation signal showing the correlation to the averaging unit 112, the averaging is performed using a correlation signal that is one symbol duration ago instead of using the correlation signal showing the correlation calculated including the impulse noise. As a result, a synchronous position of a symbol can be determined excluding the influence of impulse noise.

<FFT Window Position Setting Unit 113>

The FFT window position setting unit 113 specifies a start position candidate period for a FFT window in each received symbol, based on an averaged correlation signal output from the averaging unit 112.

Also, the FFT window position setting unit 113 receives noise occurrence information from the impulse noise detection unit 110, determines a start time of a FFT window in the range of the specified start position candidate period so as not to include an impulse noise occurrence time shown by the noise occurrence information, sets a section of the effective symbol length beginning at the determined start time as a FFT window, and outputs a FFT window signal showing the start position of the FFT window to the FFT processing unit 105.

When the FFT window cannot be set without including the impulse noise occurrence time, the FFT window position setting unit 113 outputs information indicating that the symbol processed by the FFT processing unit 105 is affected by impulse noise, to the delay adjustment unit 114.

Figure 6:
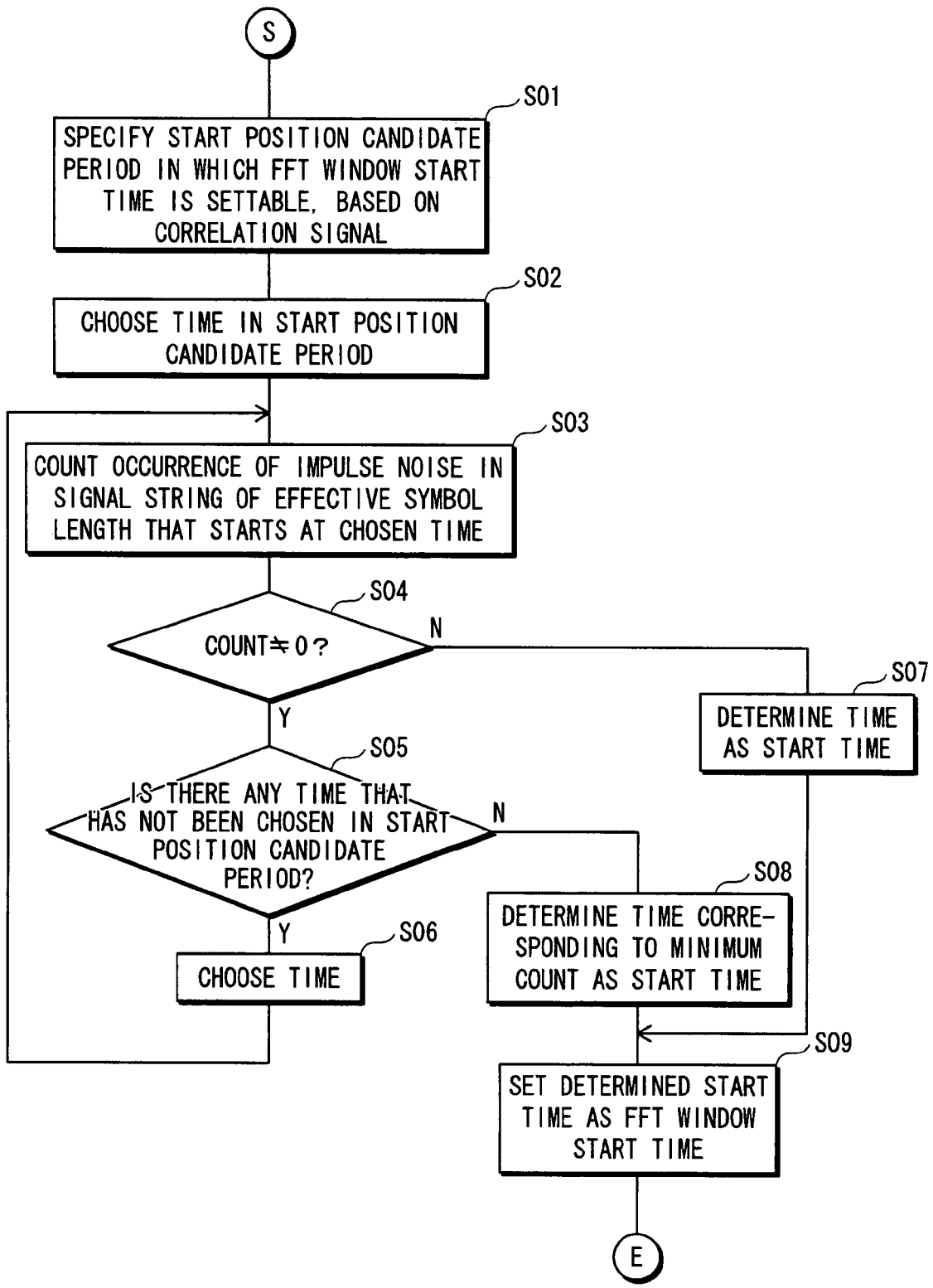
FIG. 6 shows an operation flow of a FFT window position setting unit.

The following describes the FFT window position setting process by the FFT window position setting unit 113 using an example where the moving average (integration) signal shown in FIG. 4E is output from the averaging unit 112, with reference to FIG. 6.

(FFT Window Position Setting Process)

The FFT window position setting unit 113 receives the moving average (integration) signal output from the averaging unit 112, and specifies the (t1-t2) section whose voltage level is no less than a threshold value as a start position candidate period in the symbol (step S01).

The FFT window position setting unit 113 then chooses one sampling time in the specified (t1-t2) section (step S02) and counts the occurrence of impulse noise shown by noise occurrence information received from the symbol synchronization unit 111, in a signal string of the effective symbol length (TS) beginning at the chosen time (step S03).

If the count is not 0 in step S03, that is, if an impulse noise occurrence time is included in a FFT window, the FFT window position setting unit 113 judges whether there is any sampling time that has not been chosen yet in the start position candidate period (t1-t2) (step S04: Y, step S05).

If the FFT window position setting unit 113 judges that there is an unchosen sampling time in step S05 (step S05: Y), the FFT window position setting unit 113 chooses that time, and performs the process of step S03 (step S06).

If the count is 0 in step S04, that is, if no impulse noise occurrence time is included in a FFT-window, the FFT window position setting unit 113 determines the time as a start time of a FFT window (step S04: Y, step S07).

If the FFT window position setting unit 113 judges that there is no unchosen sampling time in step S05, that is, if a FFT window cannot be set without including any impulse noise occurrence time, the FFT window position setting unit 113 determines a sampling time in the (t1-t2) section at which the impulse noise count is smallest, as the start time (step S05: Y, step S08).

The FFT window position setting unit 113 sets a section of the effective symbol length from the start time determined in step S07 or S08 as a FFT window, and outputs a FFT window signal including information about the FFT window start time to the FFT processing unit 105. In the case where the determined FFT window includes an impulse noise occurrence time, the FFT window position setting unit 113 also outputs information that the symbol contains impulse noise, to the delay adjustment unit 114 (step S09).

Note here that the above FFT window position setting process is conducted irrespective of whether the OFDM signal is affected by multipath interference.

For example, when the correlation signal shown in FIG. 5D is input in the FFT window position setting unit 113, the FFT window position setting unit 113 specifies the (t5-t6) section in FIG. 5D as a start position candidate period for symbol S1.

The FFT window position setting unit 113 sets a start time of a FFT window where the impulse noise occurrence count is 0 or smallest in the (t5-t6) section, which enables a FFT to be performed on symbol S1 in the FFT processing unit 105.

<Amplitude Control Unit 104>

The amplitude control unit 104 sets an amplitude of a signal at an impulse noise occurrence time detected by the impulse noise detection unit 110 to 0, and outputs the signal to the FFT processing unit 105.

<FFT Processing Unit 105>

The FFT processing unit 105 converts a complex signal in a time domain to a complex signal in a frequency domain by performing a FFT on a signal of a section shown by a FFT window signal set by the FFT window position setting unit 113, and outputs the generated complex signal to the frequency axis processing unit 2000 in units of symbols.

Even if the FFT window position setting unit 113 is unable to set a FFT window without including an impulse noise occurrence time, the amplitude control unit 104 sets an amplitude of a signal at the impulse noise occurrence time to 0, so that the influence of impulse noise is reduced when the FFT processing unit 105 performs a FFT.

<Delay Adjustment Unit 114>

The delay adjustment unit 114 receives symbol information output from the FFT window position setting unit 113. At a time when a complex signal of a symbol containing impulse noise after the FFT is input from the FFT processing unit 105 to a channel characteristic estimation unit 211, the delay adjustment unit 114 outputs information that the symbol is affected by impulse noise, to the channel characteristic estimation unit 211.

It is assumed here that each unit makes delay adjustment so that the FFT processing unit 105 can perform a FFT on the received OFDM signal in sync with the time shown by the FFT window signal output from the FFT window position setting unit 113.

The following describes the frequency axis processing unit 2000.

The frequency axis processing unit 2000 includes a channel equalization unit 210, the channel characteristic estimation unit 211, an interpolation unit 212, a demapping unit 220, a deinterleave unit 230, a Viterbi decoding unit 241, a RS decoding unit 242, and a reception quality calculation unit 250.

As noted earlier, a SP signal for estimating channel characteristics is inserted in the received OFDM signal. In this embodiment, one BPSK-modulated SP signal is inserted in every twelve subcarriers in a subcarrier direction (frequency direction), and the SP signal is shifted by three subcarriers in the frequency direction for each OFDM symbol, so that one SP signal is inserted in every four OFDM symbols for the same subcarrier in an OFDM symbol direction (time direction).

The following describes each of these units.

<Channel Equalization Unit 210>

The channel equalization unit 210 corrects a received data signal (an information transmission signal in an example of FIG. 7), based on channel characteristics interpolated by the interpolation unit 212.

<Channel Characteristic Estimation Unit 211>

The channel characteristic estimation unit 211 receives a complex signal from the FFT processing unit 105, and information indicating the influence of impulse noise from the delay adjustment unit 114.

The channel characteristic estimation unit 211 extracts a SP signal from the received complex signal, and estimates channel characteristics of the extracted SP signal portion based on information about a SP signal insertion position determined in advance at the transmitting end.

Here, when the channel characteristic estimation unit 211 receives symbol information from the FFT window position setting unit 113, the channel characteristic estimation unit 211 estimates channel characteristics without using a SP signal of a symbol shown by the received symbol information.

<Interpolation Unit 212>

The interpolation unit 212 interpolates a SP signal in the time axis direction based on the channel characteristics estimated by the channel characteristic estimation unit 211 to estimate channel characteristics of a subcarrier where the SP signal is located, and outputs information showing the estimated channel characteristics to the channel equalization unit 210.

The interpolation unit 212 also interpolates a SP signal in the frequency axis direction based oh the SP signal interpolated in the time axis direction, to estimate channel characteristics of all subcarriers in the symbol.

This interpolation process is explained below, using the example of FIG. 7.

Figure 7:
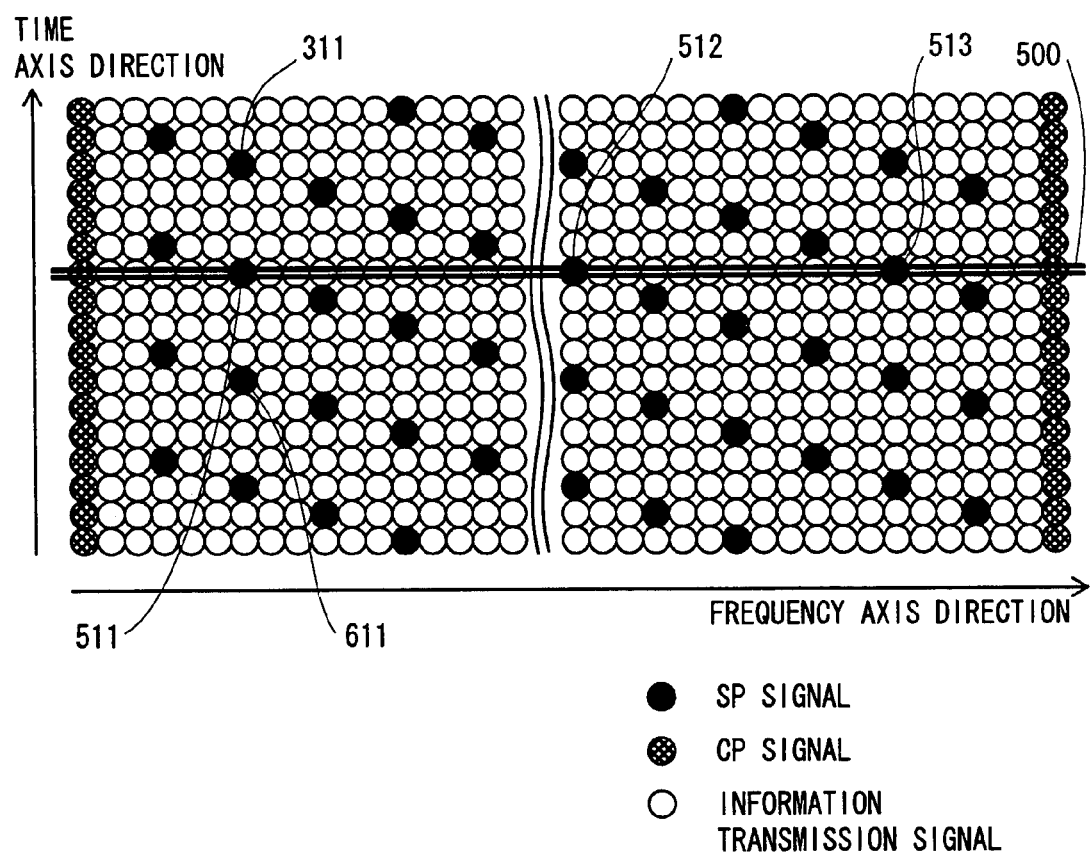
FIG. 7 shows each received symbol arranged on a plane defined by a time axis and a frequency axis.

FIG. 7 shows a signal output from the FFT processing unit 105. In FIG. 7, a black circle indicates a SP signal, and a white circle indicates an information transmission signal showing data that is transmitted.

The interpolation process in the case where symbol 500 in FIG. 7 is affected by impulse noise is explained below.

For example, to interpolate between SP signal 311 and SP signal 611 in the time axis direction based on channel characteristics of a SP signal portion estimated by the channel characteristic estimation unit 211, the interpolation unit 212 performs the interpolation using SP signal 311 and SP signal 611 without using SP signal 511. Likewise, other interpolation in the time axis direction is performed without using SP signals 512 and 513, thereby estimating channel characteristics for every three subcarriers in the frequency direction.

Next, the interpolation unit 212 performs interpolation in the frequency axis direction using the SP signal interpolated in the time axis direction, to estimate channel characteristics of all subcarriers.

<Demapping Unit 220>

The demapping unit 220 performs reallocation (demapping) on a complex signal of a data portion corrected by the channel equalization unit 210, to recover a transmission data string.

For instance, when demodulating an OFDM signal that complies with ISDB-T, the demapping unit 220 performs demapping corresponding to QPSK, 16QAM, or 64QAM.

Also, in a constellation at the time of demapping, the demapping unit 220 calculates a carrier wave power to noise power ratio (hereafter a "C/N ratio") based on an amount of deviation of a demodulated symbol point from a reference point, and outputs a C/N signal showing the calculated C/N ratio to the reception quality calculation unit 250.

<Deinterleave Unit 230>

The deinterleave unit 230 rearranges a received bit string to an original bit string based on interleave information shown by a TMCC signal, and outputs the deinterleaved bit string to the Viterbi decoding unit 241 and the reception quality calculation unit 250. For example, when continuous data is time-interleaved at a predetermined time interval at the transmitting end, the deinterleave unit 230 performs the rearrangement based on interleave information showing the time interval and the like.

<Viterbi Decoding Unit 241>

The Viterbi decoding unit 241 performs Viterbi decoding based on the deinterleaved bit string, and outputs the decoded bit string to the reception quality calculation unit 250 and the RS decoding unit 242.

<Reception Quality Calculation Unit 250>

The reception quality calculation unit 250 receives noise occurrence information from the delay adjustment unit 114 and a C/N signal from the demapping unit 220.

The reception quality calculation unit 250 performs convolution coding on the data Viterbi-decoded by the Viterbi decoding unit 241, and calculates a bit error rate before the Viterbi decoding (hereafter a "pre-Viterbi BER") based on the convolution-coded data and the data before the Viterbi decoding. The reception quality calculation unit 250 also calculates a bit error rate after the Viterbi decoding (hereafter a "post-Viterbi BER") based on the data after the Viterbi decoding and data RS-decoded by the RS decoding unit 242.

Further, the reception quality calculation unit 250 controls the activation of the RS decoding unit 242 when an impulse noise detection signal is received, when a C/N signal is no more than a threshold value, or according to the pre-Viterbi BER and the post-Viterbi BER.

Figure 8:
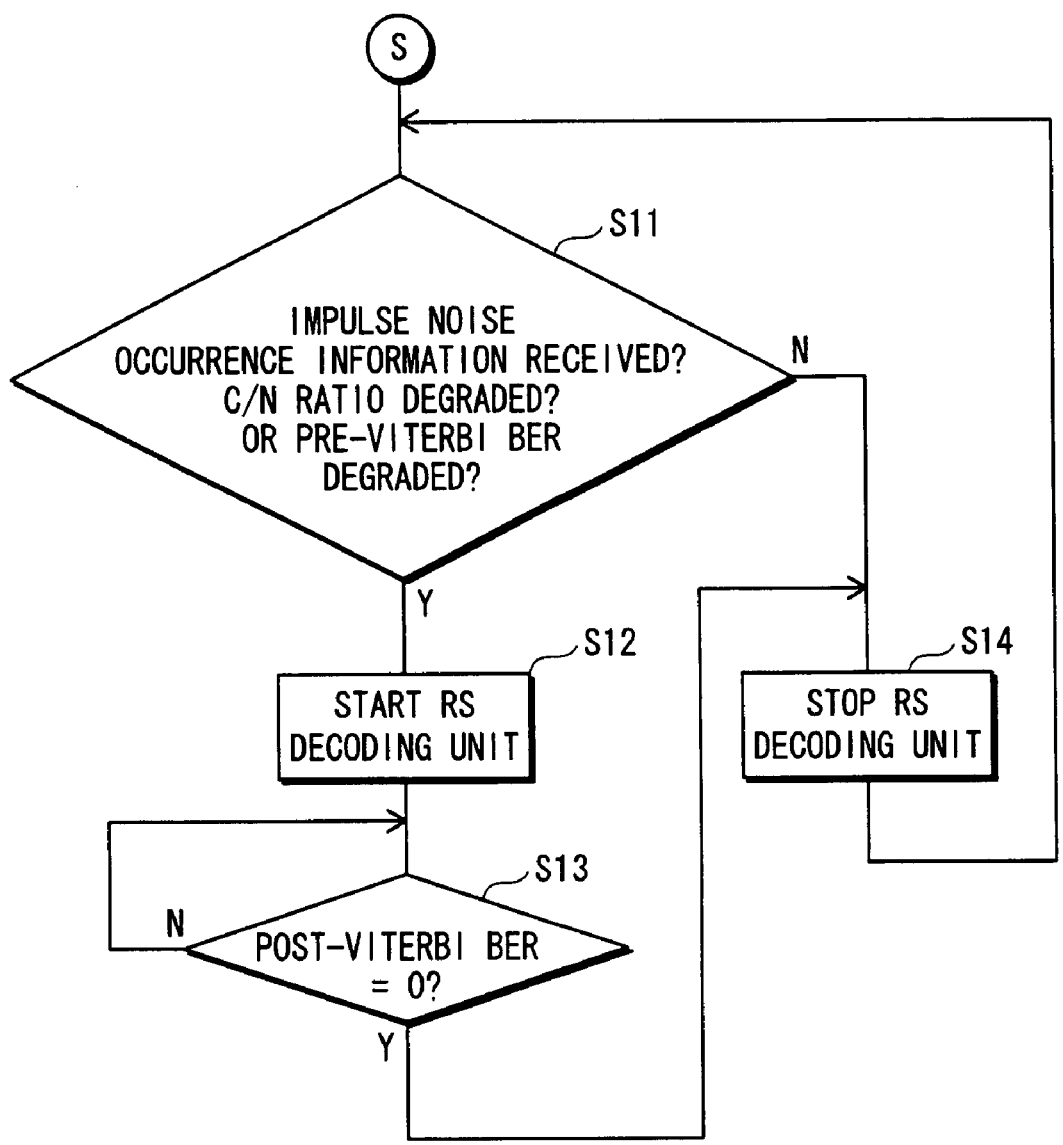
FIG. 8 shows an operation flow of a reception quality calculation unit.

The process of controlling the activation of the RS decoding unit 242 is explained below, based on an operation flowchart of the reception quality calculation unit 250 shown in FIG. 8.

The reception quality calculation unit 250 judges whether the noise occurrence information is received from the delay adjustment unit 114, whether the C/N signal received from the demapping unit 220 decreases from when the RS decoding unit 242 is stopped, and whether the calculated pre-Viterbi BER decreases from when the RS decoding unit 242 is stopped. If any of these judgments is affirmative, the reception quality calculation unit 250 instructs the RS decoding unit 242 to start decoding (step S11: Y, step S12).

The reception quality calculation unit 250 receives Viterbi-decoded data output from the Viterbi decoding unit 241 and RS-decoded data output from the RS decoding unit 242, calculates the post-Viterbi BER, and judges whether the post-Viterbi BER is 0 (step S13).

If the post-Viterbi BER is 0 in step S13, the reception quality calculation unit 250 instructs the RS decoding unit 242 to stop decoding (step S13: Y, step S14).

If the post-Viterbi BER is not 0 in step S13, the reception quality calculation unit 250 has the RS decoding unit 242 perform decoding until the post-Viterbi BER becomes 0 (step S13: N).

If none of the judgments is affirmative in step S11, the reception quality calculation unit 250 stops the RS decoding unit 242 (step S11: N).

<RS Decoding Unit 242>

The RS decoding unit 242 is activated in accordance with a start instruction by the reception quality calculation unit 250, performs Reed-Solomon decoding on the Viterbi-decoded bit string, and outputs the decoded data to the reception quality calculation unit 250 and an image processing unit (not illustrated).

The OFDM reception device according to the present invention exhibits the following effects by the above construction. Irrespective of whether the received OFDM signal is affected by multipath interference or not, if impulse noise is detected in a symbol of the received OFDM signal, when setting a FFT window position of the symbol containing a signal at a time when the impulse noise occurs, a start position of the FFT window can be set so as to exclude the impulse noise occurrence time as much as possible. In this way, the influence of impulse noise in a FFT can be reduced.

Also, when the FFT window position of the symbol cannot be set without including the impulse noise occurrence time and a FFT is performed after setting an amplitude of the signal at the impulse noise occurrence time to 0, the channel equalization is conducted without using that symbol and the error correction is forcefully performed in the demodulation and decoding process that follows the FFT. This enables bit errors to be reduced.

<Supplemental Remarks>

Although the present invention has been described by way of the above embodiment, it should be obvious that the present invention is not limited to the above. For example, the following modifications are applicable.

Figure 9:
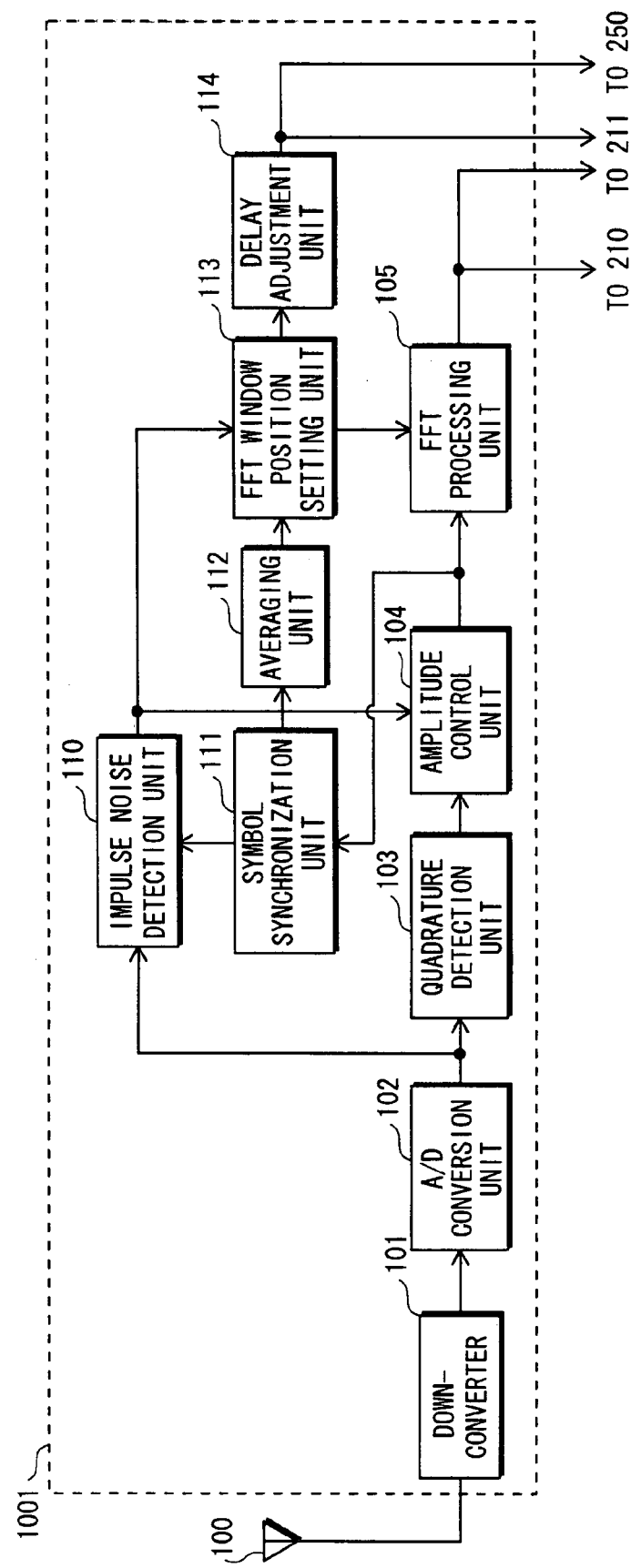
FIG. 9 is a functional block diagram of a conversion unit according to a supplemental remark (1).

(1) The above embodiment describes the case where the symbol synchronization unit 111 calculates a correlation including a complex signal at an impulse noise occurrence time and the averaging unit 112 performs averaging using a correlation signal that is one symbol duration ago instead of using a correlation signal involving the impulse noise occurrence time. Alternatively, as shown in FIG. 9, the symbol synchronization unit 111 may perform synchronization using a complex signal after the amplitude control unit 104 sets an amplitude at the impulse noise occurrence time to 0.

Figure 10:
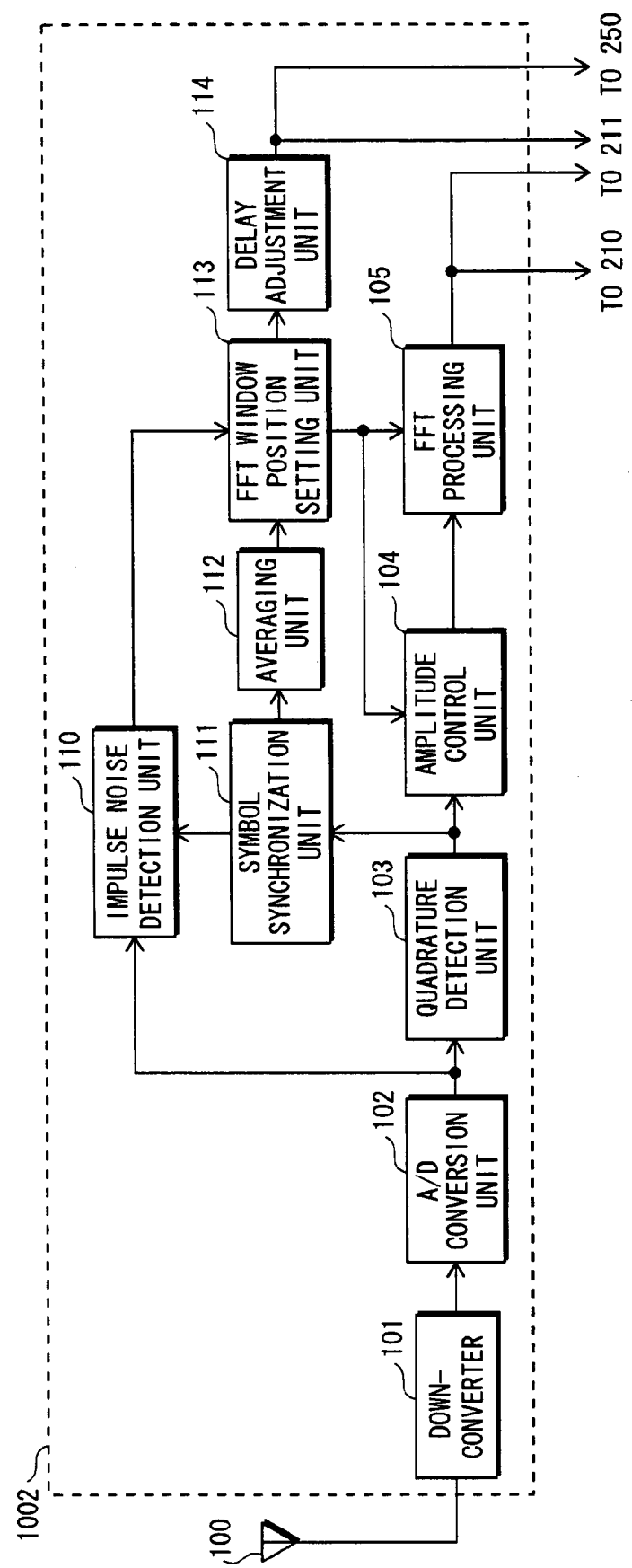
FIG. 10 is a functional block diagram of a conversion unit according to a supplemental remark (2).

(2) The above embodiment describes the case where, when the occurrence of impulse noise is detected by the impulse noise detection unit 110, the amplitude control unit 104 sets an amplitude at a time when the impulse noise occurs to 0 based on noise occurrence information output from the impulse noise detection unit 110. However, as shown in FIG. 10, the FFT window position setting unit 113 may output information showing an impulse noise occurrence time to the amplitude control unit 104 only when it is impossible to set a FFT window without including the impulse noise occurrence time, so that the amplitude control unit 104 sets the corresponding amplitude to 0 based on this information.

(3) The above embodiment describes the case where, when setting a FFT window, the FFT window position setting unit 113 controls a FFT window position so as not to include an impulse noise occurrence time by moving a start position of the FFT window of the effective symbol length within the range of the guard interval. This can be modified as follows. When the impulse noise occurrence time is within the guard interval or within the guard correspondence duration, the FFT window position setting unit 113 does not move the start position of the FFT window. If the FFT window includes the impulse noise occurrence time, instead of the signal at the impulse noise occurrence time, the FFT window position setting unit 113 extracts a corresponding signal from the guard interval or the guard correspondence duration, and uses the extracted signal for a FFT. In this case too, when the impulse noise occurrence time is not within the guard correspondence duration of the effective symbol, the amplitude of the signal at the impulse noise occurrence time is set to 0 to perform a FFT.

Figure 11:
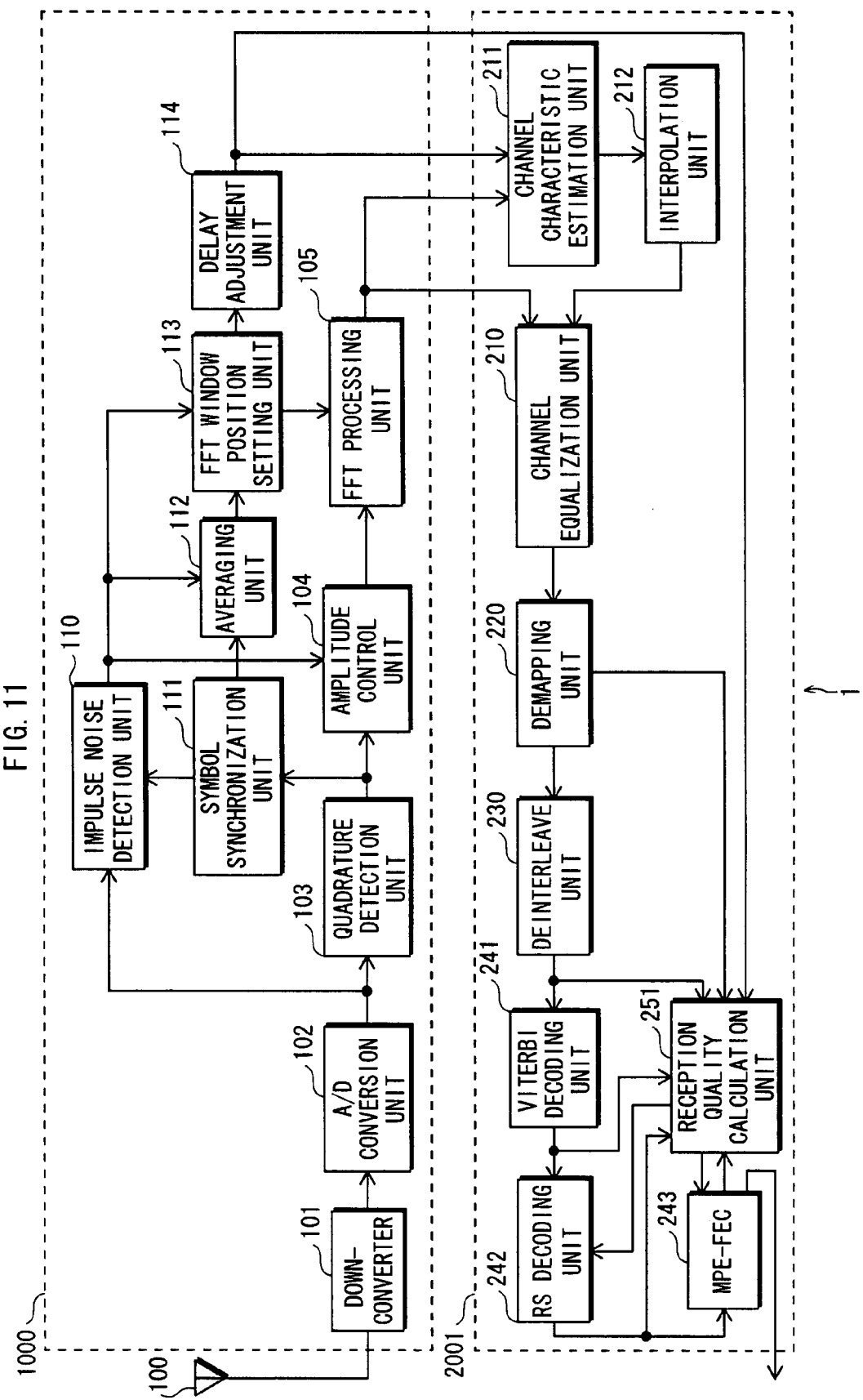
FIG. 11 is a functional block diagram of a demodulation/decoding unit according to a supplemental remark (5).

(4) The above embodiment describes a construction where ISDB-T is used. When DVB-H is used, on the other hand, a reception quality calculation unit 251 stops MPE-FEC (Multi-Protocol Encapsulation Forward Error Correction) 243 shown in FIG. 11, when a BER after RS decoding is 0. If the C/N signal decreases after the MPE-FEC is stopped, if information indicating the influence of impulse noise is received after the MPE-FEC is stopped, or if the post-Viterbi BER decreases after the MPE-FEC is stopped, the reception quality calculation unit 251 starts the MPE-FEC.

Figure 13:
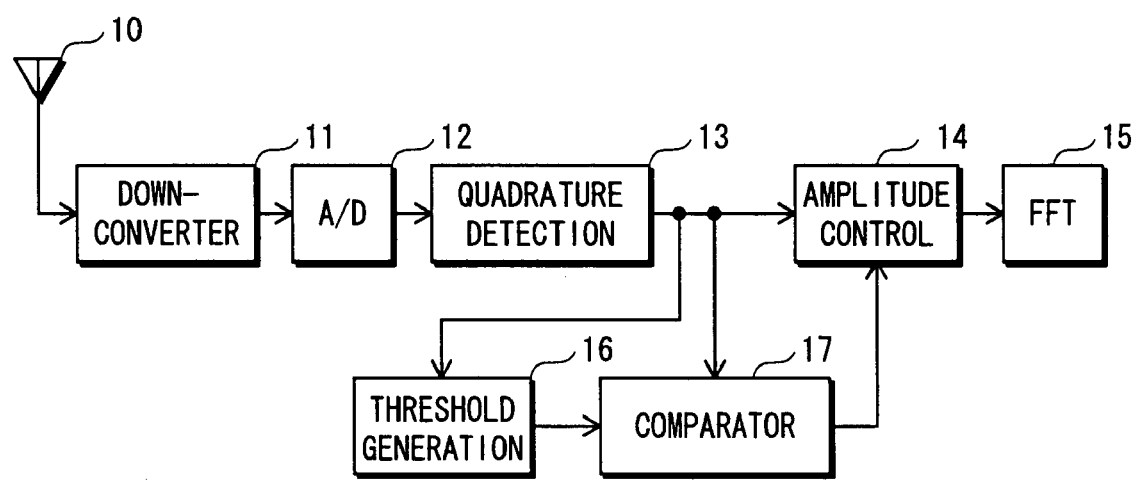
FIG. 13 is a functional block diagram of a conventional construction for reducing an influence of impulse noise.

(5) The above embodiment describes the case where when the predetermined amplitude is detected in the digital signal obtained as a result of A/D conversion of the received OFDM signal, the time of detection is notified to the amplitude control unit 104. As an alternative, the occurrence of impulse noise may be detected according to the method shown in aforementioned patent document 1. When an antenna 10 receives a symbol containing impulse noise such as the one shown in FIG. 12, a tuner of patent document 1 (see FIG. 13) performs the following operation. An A/D conversion unit 12 A/D converts the symbol to a baseband signal. A quadrature detection unit 13 performs quadrature detection on the baseband signal and outputs a resulting signal. The threshold generation unit 16 generates a threshold value for detecting impulse noise from a change in the signal output from the quadrature detection unit 13, and outputs the threshold value to a comparator 17. The comparator 17 compares the threshold value with the output of the quadrature detection unit 13 to detect impulse noise. An amplitude control unit 14 sets an amplitude of a detected impulse noise portion to 0.

(6) The above embodiment describes the case where averaging is performed using a correlation signal that is one symbol duration ago instead of using a correlation signal of a symbol containing impulse noise. Alternatively, the signal selection unit 112A may weight the correlation signal of the symbol containing the impulse noise to be smaller than the original signal value and input the weighted signal to the IIR filter for use in averaging.

(7) The above embodiment describes ISDB-T and DVB-H, but each of the above processes is applicable to the case of receiving a multicarrier signal having a guard interval, such as DVB-T.

(8) Each functional block of the above OFDM reception device is typically realized as an LSI which is an integration circuit. These blocks may be individually implemented by one chip, or partly or wholly implemented by one chip. Also, though the LSI is mentioned here, the circuit may be called an IC, a system LSI, a super LSI, or an ultra LSI, depending on the degree of integration.

Also, the integration is not limited to the LSI, and may be performed using a dedicated circuit or a general processor. A FPGA (Field Programmable Gate Array) that can be programmed or a reconfigurable processor capable of reconfiguring connections and settings of circuit cells in an LSI after producing the LSI may be used.

Furthermore, if an integrated circuit technique that replaces an LSI emerges from advancement of semiconductor technology or other derivative technology, such a technique can be used for the integration of the functional blocks. For instance, biotechnology may be adapted in this way.

INDUSTRIAL APPLICABILITY

The OFDM reception device according to the present invention can be used in a broadcast receiver for receiving terrestrial digital broadcasting.

The invention claimed is:

1. An OFDM (Orthogonal Frequency Division Multiplexing) reception device that receives an OFDM signal including a plurality of symbols, each symbol having inserted therein a guard interval signal, and demodulates the received OFDM signal by performing a FFT (Fast Fourier Transform) on a signal of an effective symbol length for each symbol, the OFDM reception device comprising:

a detection unit operable to detect an impulse noise occurrence time at which impulse noise, whose amplitude is no less than a predetermined value, occurs in the received OFDM signal; and a FFT control unit operable to, if the impulse noise occurrence time is within a duration estimated to have the guard interval signal in a symbol or within a duration estimated to have a signal equivalent to the guard interval signal in the symbol, control the FFT to be performed using a value of a signal, among a plurality of signals included in the symbol, that is equivalent to a signal at the impulse noise occurrence time, as a substitute for a value of the signal at the impulse noise occurrence time, and wherein the FFT is performed by a FFT circuit, wherein the FFT control unit includes a FFT window determination unit operable to determine, for each symbol, a signal of the effective symbol length as a FFT window that is subjected to the FFT, and supply a signal that constitutes the FFT window to the FFT circuit, wherein the guard interval signal is identical to a latter portion of an effective symbol duration signal in transmission and is inserted before the effective symbol duration signal, and wherein the FFT window determination unit determines, as a start time of the FFT window, a time which is within the duration estimated to have the guard interval signal and which is a start time of a section, having the effective symbol length, in which a number of impulse noise occurrences equals 0, or has a minimum value.

2. The OFDM reception device of claim 1, further comprising:

a correlation calculation unit operable to calculate, for each symbol, a correlation between the received OFDM signal and a delayed OFDM signal generated by delaying the received OFDM signal by the effective symbol length; and an averaging unit operable to average correlations in a plurality of symbols, except the symbol containing the impulse noise, and estimate the duration having the guard interval signal based on an average correlation.

3. The OFDM reception device of claim 1, further comprising:

a decoding unit operable to decode the OFDM signal after the FFT;

an error correction unit operable to perform error correction of the decoded signal; and an error correction control unit operable to control to start and stop the error correction unit so that the error correction unit starts the error correction when the impulse noise is detected by the detection unit.

4. An OFDM (Orthogonal Frequency Division Multiplexing) reception device that receives an OFDM signal including a plurality of symbols, each symbol having inserted therein a guard interval signal, and demodulates the received OFDM signal by performing a FFT (Fast Fourier Transform) on a signal of an effective symbol length for each symbol, the OFDM reception device comprising:

a detection unit operable to detect an impulse noise occurrence time at which impulse noise, whose amplitude is no less than a predetermined value, occurs in the received OFDM signal; and a FFT control unit operable to, if the impulse noise occurrence time is within a duration estimated to have the guard interval signal in a symbol or within a duration estimated to have a signal equivalent to the guard interval signal in the symbol, control the FFT to be performed using a value of a signal, among a plurality of signals included in the symbol, that is equivalent to a signal at the impulse noise occurrence time, as a substitute for a value of the signal at the impulse noise occurrence time, wherein the received OFDM signal has been transmitted in a state including a plurality of predetermined reference signals, wherein the OFDM reception device holds reference signal information showing the plurality of predetermined reference signals, and wherein the OFDM reception device further comprises:

a channel characteristic estimation unit operable to extract reference signals after the FFT, and estimate channel characteristics of the extracted reference signals, except a reference signal in the symbol containing the impulse noise, by comparing the extracted reference signals, except the reference signal in the symbol containing the impulse noise, with the plurality of predetermined reference signals shown by the reference signal information; and an interpolation unit operable to perform interpolation of channel characteristics of a plurality of signals included in the OFDM signal, except the plurality of predetermined reference signals, using the channel characteristics of the extracted reference signals, except the reference signal in the symbol containing the impulse noise.

5. An OFDM (Orthogonal Frequency Division Multiplexing) reception device that receives an OFDM signal including a plurality of symbols, each symbol having inserted therein a guard interval signal, and demodulates the received OFDM signal by performing a FFT (Fast Fourier Transform) on a signal of an effective symbol length for each symbol, the OFDM reception device comprising:

a detection unit operable to detect an impulse noise occurrence time at which impulse noise, whose amplitude is no less than a predetermined value, occurs in the received OFDM signal; and a FFT control unit operable to, if the impulse noise occurrence time is within a duration estimated to have the guard interval signal in a symbol or within a duration estimated to have a signal equivalent to the guard interval signal in the symbol, control the FFT to be performed using a value of a signal, among a plurality of signals included in the symbol, that is equivalent to a signal at the impulse noise occurrence time, as a substitute for a value of the signal at the impulse noise occurrence time, and wherein the FFT is performed by a FFT circuit, wherein the FFT control unit includes a FFT window determination unit operable to determine, for each symbol, a signal of the effective symbol length as a FFT window that is subjected to the FFT, and supply a signal that constitutes the FFT window to the FFT circuit, wherein the guard interval signal is identical to a latter portion of an effective symbol duration signal in transmission and is inserted before the effective symbol duration signal, wherein the OFDM reception device further comprises:

a symbol synchronization unit operable to calculate a moving-average signal, by performing moving average, for a duration which is equivalent to twice a length of the guard interval signal, on a correlation between the received OFDM signal and a delayed OFDM signal generated by delaying the received OFDM signal by the effective symbol length; and an averaging unit operable to average the moving-average signal in the symbols, and wherein the FFT window determination unit specifies a duration in which a voltage level of the averaged moving-average signal is equal to, or higher than, a threshold as a symbol start position candidate period, and specifies, as a start time of the FFT window, a time which is within the symbol start position candidate period and which is a start time of a section, having the effective symbol length, in which a number of impulse noise occurrences equals 0, or has a minimum value.

6. An OFDM (Orthogonal Frequency Division Multiplexing) reception device that receives an OFDM signal including a plurality of symbols, each symbol having inserted therein a guard interval signal, and demodulates the received OFDM signal by performing a FFT (Fast Fourier Transform) on a signal of an effective symbol length for each symbol, the OFDM reception device comprising:

a detection unit operable to detect an impulse noise occurrence time at which impulse noise, whose amplitude is no less than a predetermined value, occurs in the received OFDM signal; and a FFT control unit operable to, if the impulse noise occurrence time is within a duration estimated to have the guard interval signal in a symbol or within a duration estimated to have a signal equivalent to the guard interval signal in the symbol, control the FFT to be performed using a value of a signal, among a plurality of signals included in the symbol, that is equivalent to a signal at the impulse noise occurrence time, as a substitute for a value of the signal at the impulse noise occurrence time, and wherein the FFT is performed by a FFT circuit, wherein the FFT control unit includes a FFT window determination unit operable to determine, for each symbol, a signal of the effective symbol length as a FFT window that is subjected to the FFT, and supply a signal that constitutes the FFT window to the FFT circuit, wherein the guard interval signal is identical to a latter portion of an effective symbol duration signal in transmission and is inserted before the effective symbol duration signal, and wherein the FFT control unit, if the impulse noise occurrence time is included within the FFT window, controls the FFT to be performed using the value of the signal, among a plurality of signals included in the symbol and not included within the FFT window, that is equivalent to the signal at the impulse noise occurrence time, as the substitute for the value of the signal at the impulse noise occurrence time.

7. A non-transitory computer-readable recording medium on which a control program is recorded, the control program for causing a device that receives an OFDM (Orthogonal Frequency Division Multiplexing) signal including a plurality of symbols, each symbol having inserted therein a guard interval signal, to demodulate the received OFDM signal by performing a FFT (Fast Fourier Transform) on a signal of an effective symbol length for each symbol by causing the device to perform a method comprising:

detecting an impulse noise occurrence time at which impulse noise, whose amplitude is no less than a predetermined value, occurs in the received OFDM signal; and controlling, if the impulse noise occurrence time is within a duration estimated to have the guard interval signal in a symbol or within a duration estimated to have a signal equivalent to the guard interval signal in the symbol, the FFT to be performed using a value of a signal, among a plurality of signals included in the symbol, that is equivalent to a signal at the impulse noise occurrence time, as a substitute for a value of the signal at the impulse noise occurrence time, wherein the FFT is performed by a FFT circuit, wherein the controlling the FFT includes determining, for each symbol, a signal of the effective symbol length as a FFT window that is subjected to the FFT, and supplying a signal that constitutes the FFT window to the FFT circuit, wherein the guard interval signal is identical to a latter portion of an effective symbol duration signal in transmission and is inserted before the effective symbol duration signal, and wherein the determining the signal of the effective symbol length as the FFT window that is subjected to the FFT includes determining, as a start time of the FFT window, a time which is within the duration estimated to have the guard interval signal and which is a start time of a section, having the effective symbol length, in which a number of impulse noise occurrences equals 0, or has a minimum value.

8. A non-transitory computer-readable recording medium on which a control program is recorded, the control program for causing a device that receives an OFDM (Orthogonal Frequency Division Multiplexing) signal including a plurality of symbols, each symbol having inserted therein a guard interval signal, to demodulate the received OFDM signal by performing a FFT (Fast Fourier Transform) on a signal of an effective symbol length for each symbol by causing the device to perform a method comprising:

detecting an impulse noise occurrence time at which impulse noise, whose amplitude is no less than a predetermined value, occurs in the received OFDM signal; and controlling, if the impulse noise occurrence time is within a duration estimated to have the guard interval signal in a symbol or within a duration estimated to have a signal equivalent to the guard interval signal in the symbol, the FFT to be performed using a value of a signal, among a plurality of signals included in the symbol, that is equivalent to a signal at the impulse noise occurrence time, as a substitute for a value of the signal at the impulse noise occurrence time, wherein the received OFDM signal has been transmitted in a state including a plurality of predetermined reference signals, wherein the device holds reference signal information showing the plurality of predetermined reference signals, and wherein the method further comprises:

extracting reference signals after the FFT, and estimating channel characteristics of the extracted reference signals, except a reference signal in the symbol containing the impulse noise, by comparing the extracted reference signals, except the reference signal in the symbol containing the impulse noise, with the plurality of predetermined reference signals shown by the reference signal information; and interpolating channel characteristics of a plurality of signals included in the OFDM signal, except the plurality of predetermined reference signals, using the channel characteristics of the extracted reference signals, except the reference signal in the symbol containing the impulse noise.

9. A non-transitory computer-readable recording medium on which a control program is recorded, the control program for causing a device that receives an OFDM (Orthogonal Frequency Division Multiplexing) signal including a plurality of symbols, each symbol having inserted therein a guard interval signal, to demodulate the received OFDM signal by performing a FFT (Fast Fourier Transform) on a signal of an effective symbol length for each symbol by causing the device to perform a method comprising:

detecting an impulse noise occurrence time at which impulse noise, whose amplitude is no less than a predetermined value, occurs in the received OFDM signal; and controlling, if the impulse noise occurrence time is within a duration estimated to have the guard interval signal in a symbol or within a duration estimated to have a signal equivalent to the guard interval signal in the symbol, the FFT to be performed using a value of a signal, among a plurality of signals included in the symbol, that is equivalent to a signal at the impulse noise occurrence time, as a substitute for a value of the signal at the impulse noise occurrence time, wherein the FFT is performed by a FFT circuit, wherein the controlling the FFT includes determining, for each symbol, a signal of the effective symbol length as a FFT window that is subjected to the FFT, and supplying a signal that constitutes the FFT window to the FFT circuit, wherein the guard interval signal is identical to a latter portion of an effective symbol duration signal in transmission and is inserted before the effective symbol duration signal, wherein the method further comprises:

calculating a moving-average signal, by performing moving average, for a duration which is equivalent to twice a length of the guard interval signal, on a correlation between the received OFDM signal and a delayed OFDM signal generated by delaying the received OFDM signal by the effective symbol length; and averaging the moving-average signal in the symbols, and wherein the determining the signal of the effective symbol length as the FFT window that is subjected to the FFT includes specifying a duration in which a voltage level of the averaged moving-average signal is equal to, or higher than, a threshold as a symbol start position candidate period, and specifies, as a start time of the FFT window, a time which is within the symbol start position candidate period and which is a start time of a section, having the effective symbol length, in which a number of impulse noise occurrences equals 0, or has a minimum value.

10. A non-transitory computer-readable recording medium on which a control program is recorded, the control program for causing a device that receives an OFDM (Orthogonal Frequency Division Multiplexing) signal including a plurality of symbols, each symbol having inserted therein a guard interval signal, to demodulate the received OFDM signal by performing a FFT (Fast Fourier Transform) on a signal of an effective symbol length for each symbol by causing the device to perform a method comprising:
- detecting an impulse noise occurrence time at which impulse noise, whose amplitude is no less than a predetermined value, occurs in the received OFDM signal; and
- controlling, if the impulse noise occurrence time is within a duration estimated to have the guard interval signal in a symbol or within a duration estimated to have a signal equivalent to the guard interval signal in the symbol, the FFT to be performed using a value of a signal, among a plurality of signals included in the symbol, that is equivalent to a signal at the impulse noise occurrence time, as a substitute for a value of the signal at the impulse noise occurrence time,
- wherein the FFT is performed by a FFT circuit,
- wherein the controlling the FFT includes determining, for each symbol, a signal of the effective symbol length as a FFT window that is subjected to the FFT, and supplying a signal that constitutes the FFT window to the FFT circuit,
- wherein the guard interval signal is identical to a latter portion of an effective symbol duration signal in transmission and is inserted before the effective symbol duration signal, and
- wherein, if the impulse noise occurrence time is included within the FFT window, the controlling the FFT includes controlling the FFT to be performed using the value of the signal, among a plurality of signals included in the symbol and not included within the FFT window, that is equivalent to the signal at the impulse noise occurrence time, as the substitute for the value of the signal at the impulse noise occurrence time.

\* \* \* \* \*